United States Patent [19]

Suzuki et al.

[11] Patent Number: 4,714,303
[45] Date of Patent: Dec. 22, 1987

[54] HOUSING AND SECURING STRUCTURE FOR RADIO COMMUNICATION DEVICE

[75] Inventors: Narumi Suzuki, Ohtawara; Hisamitsu Takagi, Inagi, both of Japan

[73] Assignee: Fujitsu Limited, Kawasaki, Japan

[21] Appl. No.: 749,278

[22] Filed: Jun. 27, 1985

[30] Foreign Application Priority Data

Aug. 30, 1984 [JP] Japan .................. 59-179331

[51] Int. Cl.⁴ .......................................... A42B 81/00
[52] U.S. Cl. ...................... 312/7.1; 248/251
[58] Field of Search .............. 248/551, 552, 553; 312/2.1, 2.2, 320, 257 R; 70/422, 451; 220/327

[56] References Cited

U.S. PATENT DOCUMENTS

| | | | |
|---|---|---|---|
| 845,019 | 2/1907 | Voight | 70/427 |
| 2,629,764 | 2/1953 | Wiley | 312/7.1 |
| 3,095,227 | 6/1963 | Casebolt | 70/451 |
| 3,104,860 | 9/1963 | Brittain | 248/552 |
| 4,305,266 | 12/1981 | Lockwood | 248/553 |

FOREIGN PATENT DOCUMENTS

| | | |
|---|---|---|
| 56-57342 | 5/1981 | Japan . |
| 58-83441 | 5/1983 | Japan . |
| 58-168337 | 10/1983 | Japan . |
| 59-9583 | 1/1984 | Japan . |
| 59-25433 | 2/1984 | Japan . |

Primary Examiner—Joseph Falk
Attorney, Agent, or Firm—Staas & Halsey

[57] ABSTRACT

A housing and securing structure for a radio communication device mounted in a vehicle such as a car, the structure including: a case for housing a radio communication device, which case comprises an upper lid, a bottom lid and a main housing body; a mount for mounting the case in such a manner that the bottom lid faces a mount surface of the mount which is secured to a predetermined place in a vehicle. The case is coupled to the mount by a projection member which projects in the direction parallel to the mount surface and an engagement member which defines a recess for receiving the projection member, the projection member being disposed on one of the case and the mount and the engagement member being disposed on the other one of the case and the mount. A first screw having a head for urging the engagement member onto the projection member; and, a second screw which is inserted from the bottom lid side into the case, penetrates through the main housing body and is screwed to the inside of the upper lid so as to simultaneously combine the upper lid, bottom lid and main housing body into one unit.

11 Claims, 21 Drawing Figures

Fig.3
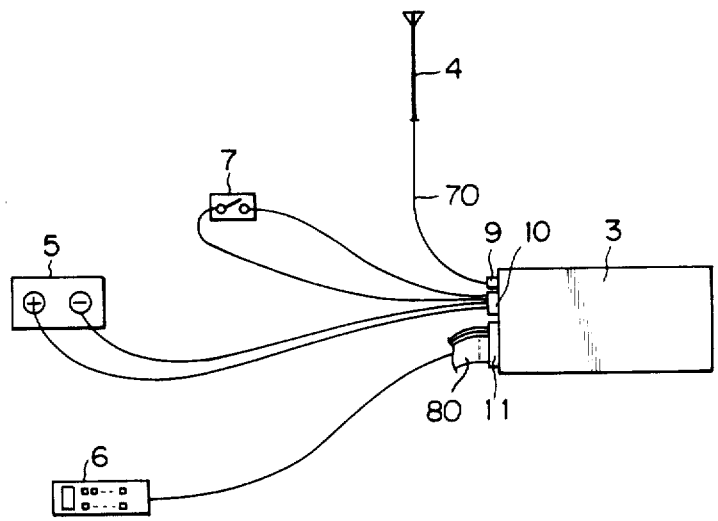
Fig.6a  Fig.7  Fig.8a
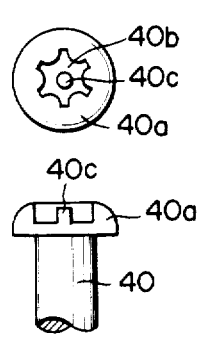 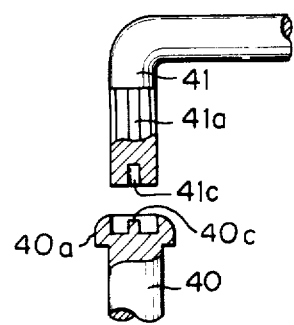 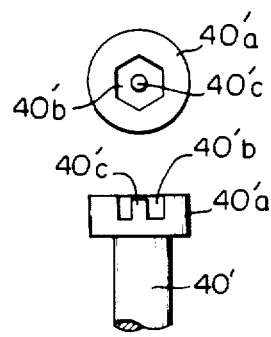
Fig.6b  Fig.8b

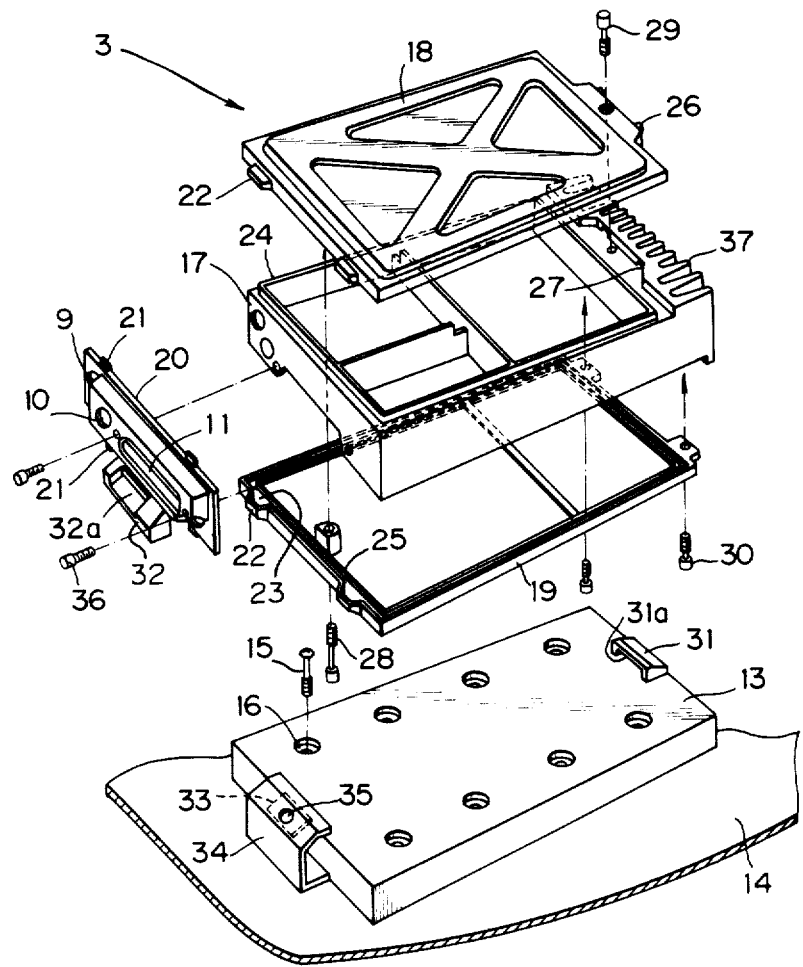

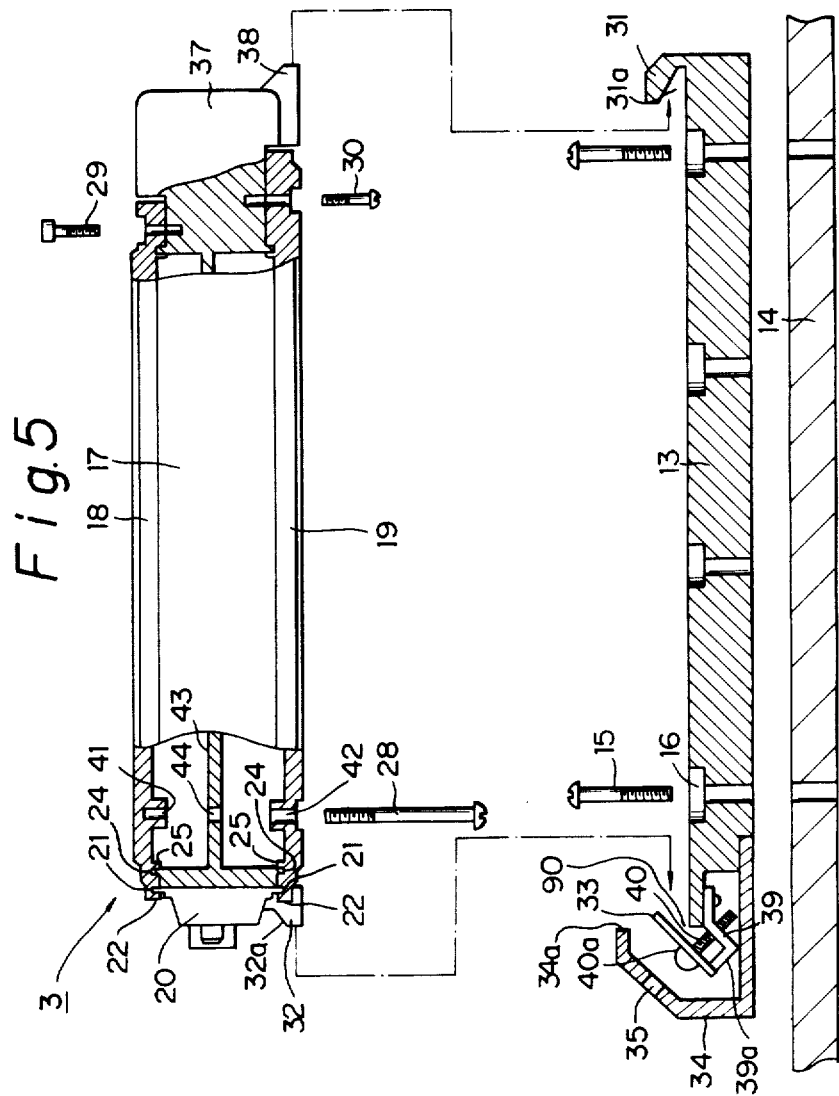

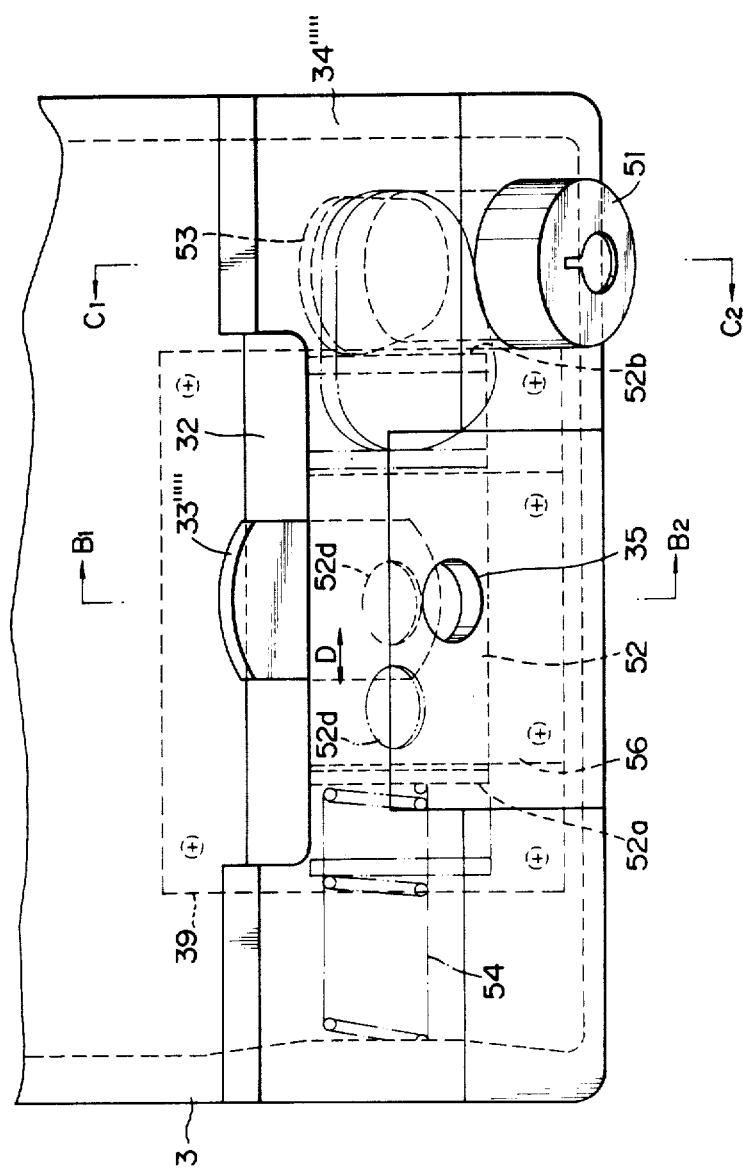

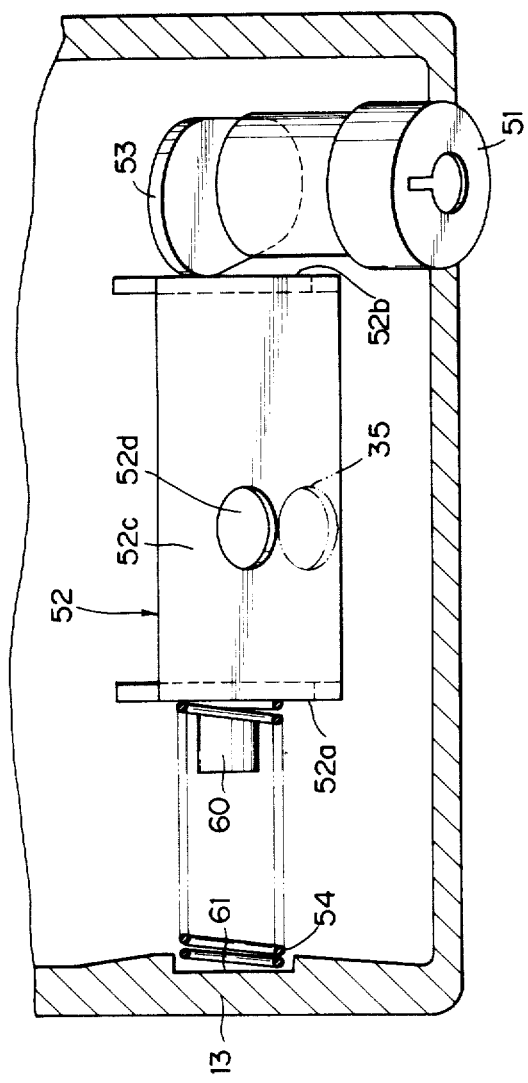

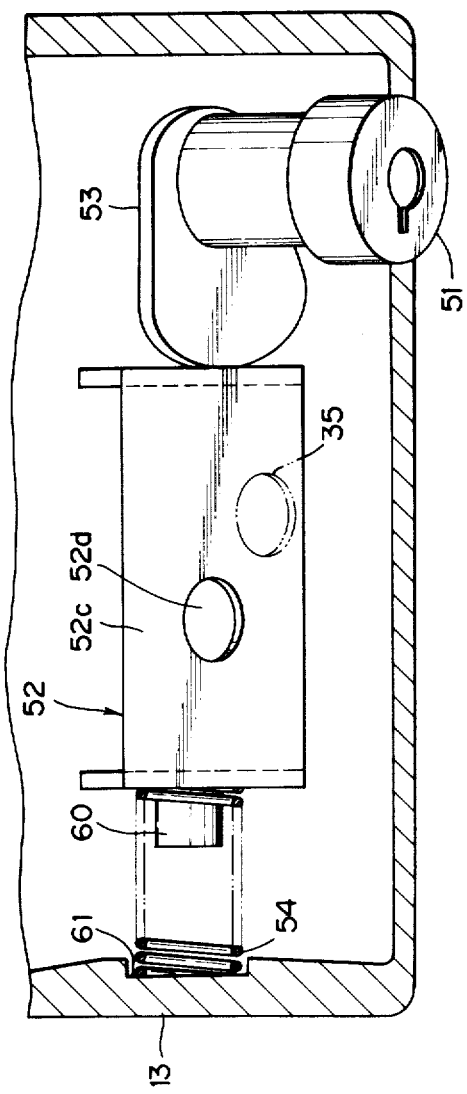

HOUSING AND SECURING STRUCTURE FOR RADIO COMMUNICATION DEVICE

BACKGROUND OF THE INVENTION

1. Field of the Invention

The present invention relates to a housing and securing structure for a radio communication device, such as a car telephone, mounted on a vehicle such as an automobile.

2. Description of the Related Art

A mobile radio communication device, such as a car telephone, is convenient and useful in that it can be connected to a general telephone network through a transmission exchange covering the area wherein the car is running. Preferably, such a car telephone can be easily removed from one car and attached to another car, since otherwise, more than one car telephone must be purchased and this is not cost-efficient. On the other hand, the car telephone must not be too easily removable or accessible, since it may be easily tampered with or stolen.

The conventional car telephone apparatus comprises an antenna, a control unit provided within a handset, and a tranceiver unit which constitutes a radio communication device, the whole being powered by connection to a battery of the car. The tranceiver unit is usually placed in the trunk of the car and secured there by screws. The outer cover of the tranceiver unit is also secured by screws. These screws are accessible from outside of the unit and can be easily unscrewed. Therefore, the tranceiver unit can be easily opened and tampered with or stolen.

SUMMARY OF THE INVENTION

An object of the present invention is to provide a housing and securing structure for a radio communication device such as a tranceiver unit of a car telephone apparatus, wherein the device can be easily attached and removed by the owner thereof but is not easily removable or opened by a third person.

A housing and securing structure for a radio communication device in accordance with the present invention comprises: a case for housing a radio communication device, which case includes an upper lid, a bottom lid, and a main housing body; a mount for mounting the case in such a manner that the bottom lid faces a mount surface, the mount being secured to a predetermined place in a vehicle such as a car; means for coupling the case to the mount, this means including a projection member projecting in a direction parallel to the mount surface and an engagement member which defines a recess for receiving the projection member, the projection member being disposed on either the case or the mount and the engagement member being disposed on either the case or the mount, opposing the projection member; a screw having a head for urging the engagement member onto the projection member; and another screw inserted from the bottom lid side into the case and penetrating through the main housing body to engage the inside of the upper lid in such a manner as to simultaneously combine the upper lid, bottom lid and main housing body into one unit.

BRIEF DESCRIPTION OF THE DRAWINGS

FIG. 3 is a block diagram of the car telephone apparatus.

FIG. 4 is an exploded view of a radio communication device in accordance with the present invention.

FIG. 5 is a sectional view of an embodiment of the housing and securing structure for the radio communication device in accordance with the present invention.

FIGS. 6A and 6B are top and partial side views, respectively, showing an example of a screw used in the present invention.

FIG. 7 is a partial sectional and side view of the screw of FIGS. 6A and 6B and an instrument for manipulating the screw.

FIGS. 8A and 8B are top and partial side views showing another example of the screw used in the present invention.

FIG. 14 is a partial front view of still another embodiment of the present invention.

FIG. 15 is partial front cut-away view of the embodiment of FIG. 14, illustrating one operational state.

FIG. 16 is partial front cut-away view of the embodiment of FIG. 14, illustrating another operational state.

DESCRIPTION OF THE PREFERRED EMBODIMENTS

Figure 1:
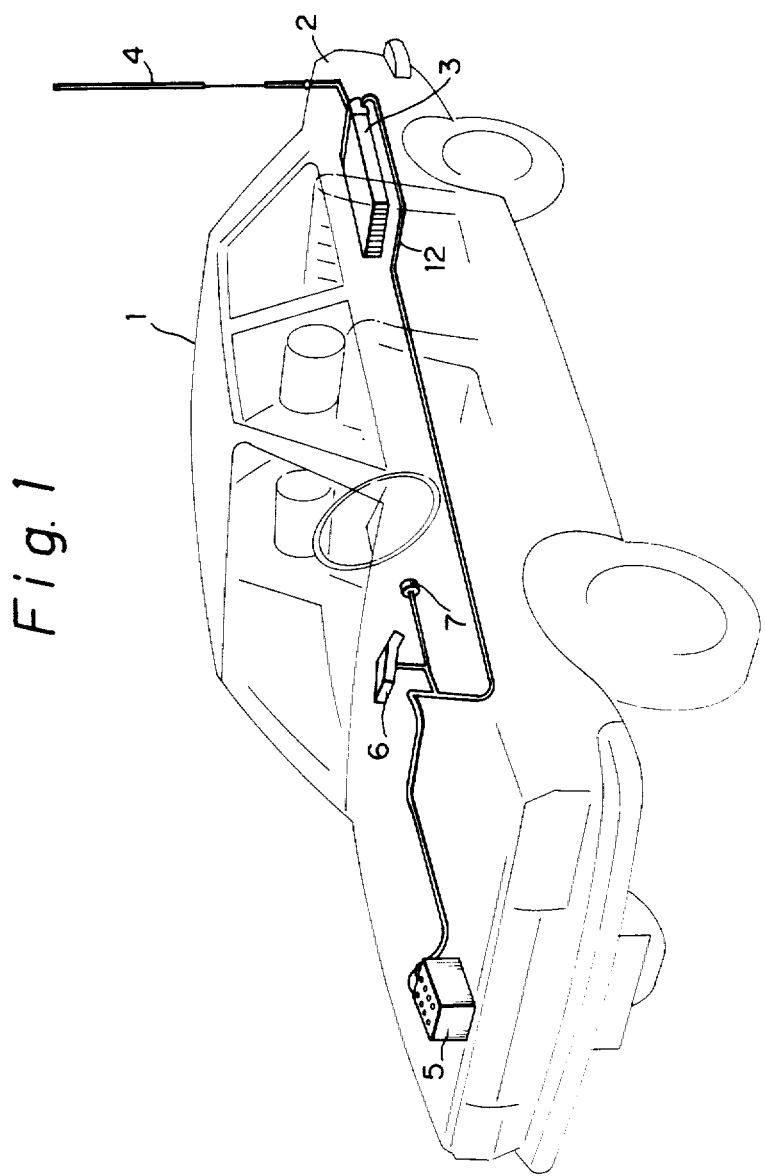
FIG. 1 is a perspective view of a car telephone apparatus mounted in a vehicle such as a car.
Figure 2:
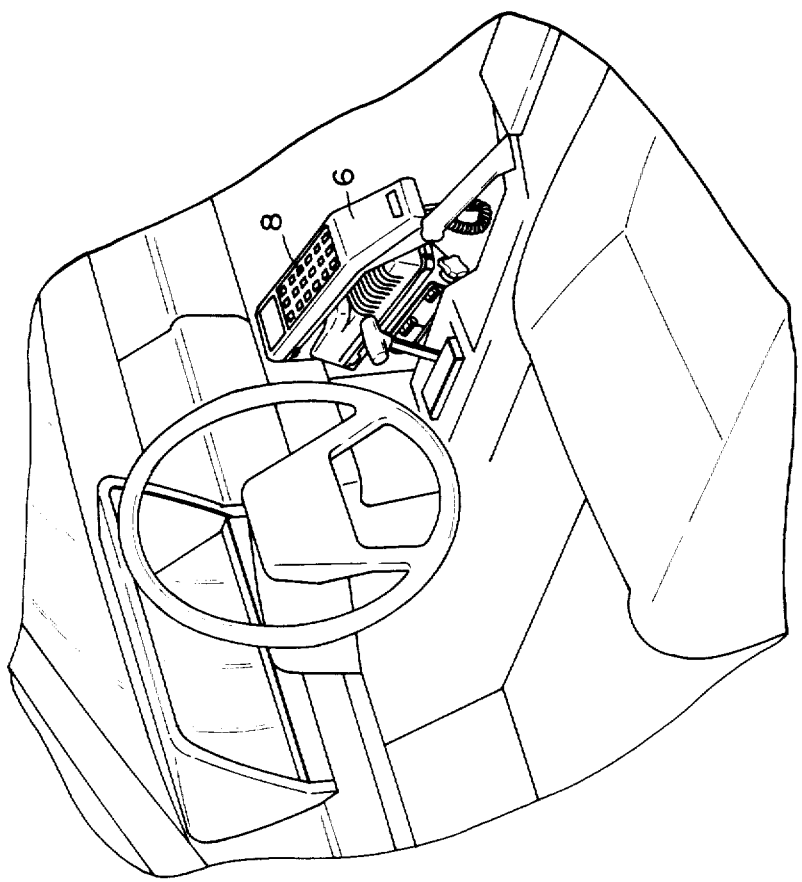
FIG. 2 is a perspective view of a handset of the car telephone apparatus.

FIG. 1 shows a car telephone mounted in a vehicle such as a car. In FIG. 1, a tranceiver unit 3 is placed and secured in a rear trunk 2 of an automobile 1. Communication circuit devices (not shown) are housed in the tranceiver unit 3. An antenna 4, a battery 5, a control unit 6, and an ignition switch 7 for starting the engine (not shown) of the automobile 1 are arranged as shown in FIG. 1. The control unit 6 constitutes a handset equipped with push-buttons 8 and disposed close to the driver's seat, as illustrated in FIG. 2. A microprocessor (not shown) for controlling the function of the tranceiver unit 3 and various memory circuits (not shown) are housed within the control unit 6. The numeral 12 (FIG. 1) designates a cable for electrical connection. The tranceiver unit 3 is connected to the antenna 4 via a coaxial connector 9 and a coaxial cable 70, as illustrated in FIG. 3. The tranceiver unit 3 is also connected to the battery 5 and the ignition switch 7 via a connector 10. The tranceiver unit 3 includes an inner circuit (not shown) for supplying power to the unit 3 when power is supplied to the circuit from the battery 5 by turning ON the ignition switch 7. The tranceiver unit 3 and the control unit (handset) 6 are interconnected by a flat cable 80 and a connector 11 having a number of pin contacts (not shown).

FIG. 4 is an exploded view of the tranceiver unit 3 in accordance with the present invention. A mount 13 for mounting the tranceiver unit 3 is secured to a floor 14 of a vehicle trunk by screws 15 (only one screw illustrated) which are screwed to the floor 14 through penetration holes 16 of the mount 13. Preferably, a number of penetration holes 16 are formed in the mount so that these holes 16 can be selectively used according to the location of a vehicle body frame (not shown) disposed under the floor 14, i.e., where the floor plate is thin and the screws 15 must be screwed into the vehicle body frame.

The tranceiver unit 3 comprises a case formed by a main housing body 17, an upper lid 18, a bottom lid 19, and a front panel 20. The front panel 20 is equipped with a coaxial connector 9 for the coaxial cable for connection with the antenna 4, a connector 10 for the cable for connection with the battery 5 and the ignition switch 7, and a connector 11 for the cable for connection with the control unit 6. Two projection pieces 21 are arranged on each of the upper edge and the lower edge of the front panel 20. Each projection piece 21 is received in a recess 23 of a projection 22 provided on each of the upper lid 18 and the bottom lid 19 corresponding to each projection piece 21 of the front panel 20.

A projection frame 24 for positioning the lid 18 is formed on each of the upper rim and the lower rim of the main housing body 17. A projection frame 25 is formed on the inner side of each of the upper lid 18 and the bottom lid 19, corresponding to the projection frame 24 of the main housing body 17, so that the lids 18 and 19 fit to the main housing body 17.

Projections 26 are provided on the rear edge of the upper lid 18 for coupling with the main housing body 17 which has holes 27 for receiving the projection 26 of the upper lid 18.

A screw 28 is used to assemble the case in such a manner that the projections 26 of the upper lid 18 are inserted into the hole 27 of the main housing body 17, the projection frame 25 of each of the upper lid 18 and the bottom lid 19 fits into the projection frame 24 of the main housing body 17, and each of the upper and lower projection pieces 21 of the front panel 20 is received into the corresponding recess 23 of the projection 22 of each of the upper lid 18 and the bottom lid 19. The screw 28 is inserted from the bottom lid 19 side into the case. The screw 28 penetrates the bottom lid 19 through a hole 42 (FIG. 5) formed therein, is further inserted through a hole 44 formed in an intermediate partition floor 43 of the main housing body 17, and is then screwed into a screw hole 41 formed on the inside of the upper lid 18, so that the main housing body 17, the upper lid 18, the bottom lid 19, and the front panel 20 are coupled together as one unit. With the above mentioned construction, since the screw 28 is inserted from the bottom lid side, the screw 28 cannot be manipulated from the exposed outside of the tranceiver unit 13 which is mounted on the mount 3 in such a manner that the bottom lid 19 faces the mount surface. Therefore, the upper lid 18 and the front panel 20 cannot be opened or removed by manipulation from the outside, which prevents the tranceiver unit 3 from tampering and theft.

The upper lid 18 and the bottom lid 19 are further secured to the main housing body 17 by screws 29 and 30 at the rear end portion of the tranceiver unit 3, in order to tightly seal gaskets (not shown) disposed along the upper and lower rims of the main housing body 17. It is, of course, possible to use a long screw as the aforementioned screw 28 instead of the screw 30 and delete the screw 29, so as to simultaneously combine the two lids 18 and 19 with the main housing body 17 with one screw from the bottom lid 19 side in the same manner as the screw 28.

A receiver member 31 having a recess 31a is disposed on the rear portion of the mount 13. The main housing body 17 has a projection member 38 (FIG. 5) which projects in the direction parallel to the mount surface, at the rear and lower portion thereof. The projection member 38 enters the recess 31a of the receiver member 31.

Also, a projection member 32 having an inclined surface 32a and projecting in the direction parallel to the mount surface is formed at the lower end of the front panel 20. The projection member 32 of the front panel 20 is received within a recess 90 defined by a pressing plate 33 and the mount surface at the front end of the mount 13, and secured there by the pressing plate 33. The pressing plate 33 is in contact with the inclined surface 32a of the projection 32 and is pressed on the projection 32 by screwing a screw 40 so that the tranceiver unit 3 is securely held on the mount 13. The screw 40 is supported on and screwed to a bracket 39 which is secured to the front end of the mount 13. The bracket 39 has a stop 39a at an end thereof. The pressing plate 33 abuts against the stop 39a when the pressing plate 33 is pressed against the projection 32 by screwing the screw 40.

A cover 34 is attached to the front end portion of the mount 13 to cover the screw 40 and the pressing plate 33. The cover 34 has a through hole 35 through which an instrument for manipulating the screw 40 is inserted. The inner diameter of the through hole 35 is smaller than the outer diameter of the head 40a of the screw 40, to prevent the screw 40 from falling out of the bracket 39 when the screw 40 is loosened. The cover 34 is arranged in such a manner that an end 34a thereof is retracted to ensure that the end 34a does not block the projection member 32 when placing the tranceiver unit 3 on the mount 13 and the screw head 40a abuts to the inside of the cover 34 before the screw 40 falls when loosened.

The front panel 20 is further rigidly secured to the main housing body 17 by screws 36 (FIG. 4).

Heat radiation fins 37 are provided at the rear end of the main housing body 17 to cool heat generative electronic parts (not shown) housed within the transceiver unit. The projection member 38 (FIG. 5) for coupling the tranceiver unit 3 to the mount 13, which member is formed at the rear and lower end of the main housing body 17, also serves to cool the tranceiver unit 3 by transferring heat from the transceiver unit 3 to the mount 13. Therefore, the projection 38 is preferably large and in tight contact with the mount surface to achieve an effective heat transfer.

In the aforementioned description, the term "front" indicates the accessible and manipulative side of the tranceiver unit 3 at the time of manipulating the screw 40 for attaching and detaching the tranceiver unit 3 to and from the mount 13. The term is also used in the same meaning in the description hereinafter.

Preferably a tamper-proof type screw is used as the screw 40 which urges the pressing plate 33 against the projection member 32 of the front panel 20. An example of the tamper-proof type screw 40 is illustrated in FIGS. 6A and 6B. A recess 40b having a specific shape (a six-rayed star shape, in this example) is formed in the screw head 40a. A pin 40c projects at the center of the recess 40b. A specific instrument 41 for manipulating such a tamper-proof screw 40 is illustrated in FIG. 7. The instrument 41 has an insertion end 41a having a shape corresponding to that of the recess 40b of the screw head 40a. A hole 41c for receiving the pin 40c of the screw head 40a is formed at the center of the end face of the instrument 41, so that the insertion end 41a of the instrument 41 can be inserted into the recess 40b of the screw head 40a without being blocked by the pin 40c of the screw head 40a, thus making it possible to turn the screw 40 by the specific instrument 41. A normal screw-driver instrument cannot be used to turn the specific screw 40 because the pin 40c blocks the insertion of such an instrument.

Another example of the specific screw 40' is illustrated in FIGS. 8A and 8B. In this example, a hexagonal recess 40'b is formed in the screw head 40'a having a pin 40'c projecting at the center of the hexagonal recess 40'b, similar to the example of FIG. 6. The instrument for manipulating this specific screw 40' must have an insertion end having a hexagonal shape and a hole for receiving the pin 40'c at the end face of the instrument, in a similar manner to that of FIG. 7. By using such a tamper-proof type screw, the tranceiver unit 3 can not be easily tampered with or stolen, since the transceiver unit 3 cannot be dismounted by using an instrument other than the specific instrument prepared for the specific screw. Such an effort is further enhanced because of the cover 34.

Screws (15, 28, 29, 30, 36) other than the screw 40 for applying force to the pressing plate 33 also may be of the tamper-proof type. Especially, the screw 29 (FIG. 4, FIG. 5) for securing the upper lid 18 to the main housing body 17 is preferably of the tamper-proof type, since the screw 29 is accessible from the outside.

Figure 9:
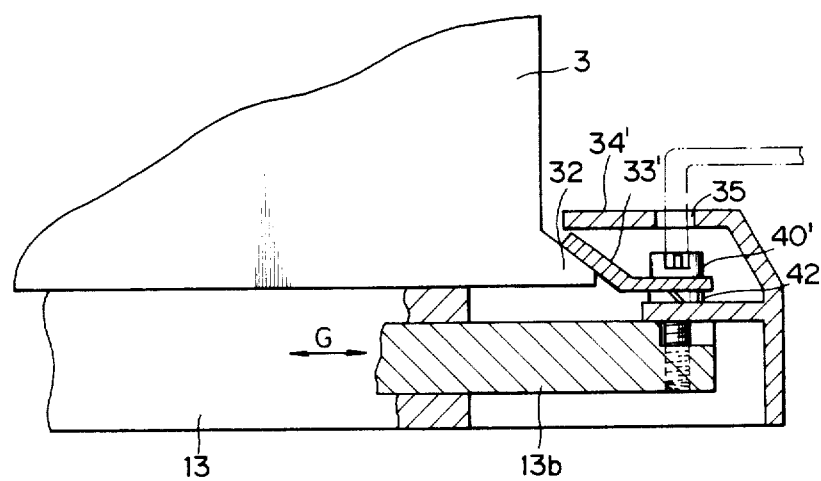
FIG. 9 is a partial sectional view of another embodiment of the present invention.

FIG. 9 is a partial sectional view of another embodiment of the present invention. In this example, the structure for securing the front projection member 32 of the transceiver unit 3 is different from that of the aforementioned first embodiment. The pressing plate 33' is bent in such a manner that the screw 40 is disposed vertically. Cover 34' covers the screws 40'. The numeral 42 designates a spring washer. The screw 40 is screwed to a support member 13b which is slidable with respect to the mount 13, as shown by a double headed arrow G. The support member 13b protrudes from the mount 13, the length thereof adjusted according to the size of the tranceiver unit 3, and then secured to the mount 13 by a screw means (not shown). The other construction, function and effect of this embodiment are substantially the same as those of the first embodiment.

Figure 10:
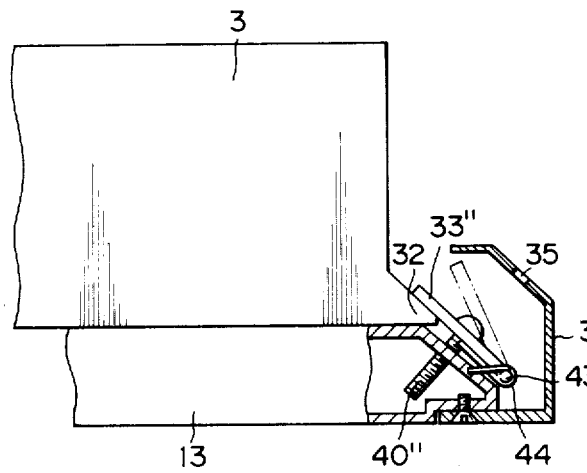
FIG. 10 is a partial sectional view of still another embodiment of the present invention.
Figure 11:
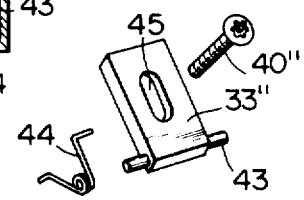
FIG. 11 is a detailed exploded view of part of the embodiment of FIG. 10.

A further embodiment of the present invention is illustrated in FIG. 10. in this example, the pressing plate 33'' is rotatable about an axis 43 which is attached to the cover 34'' and forced upward by a spring 44. The screw 40'' is screwed to the mount side through a slot 45 formed in the pressing plate 33'', as illustrated in FIG. 11. With this construction, by loosening the screw 40, the pressing plate 33'' is spontaneously moved upward and opened, which is convenient when inserting the projection 32 of the transceiver unit 3.

Figure 12:
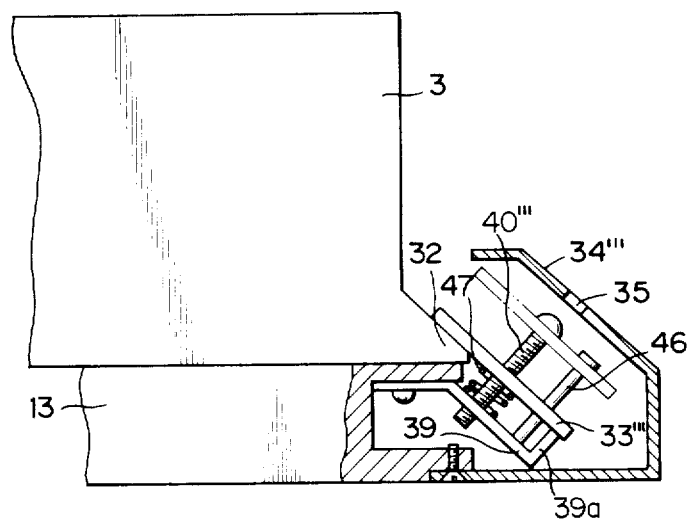
FIG. 12 is a partial sectional view of still another embodiment of the present invention.
Figure 17:
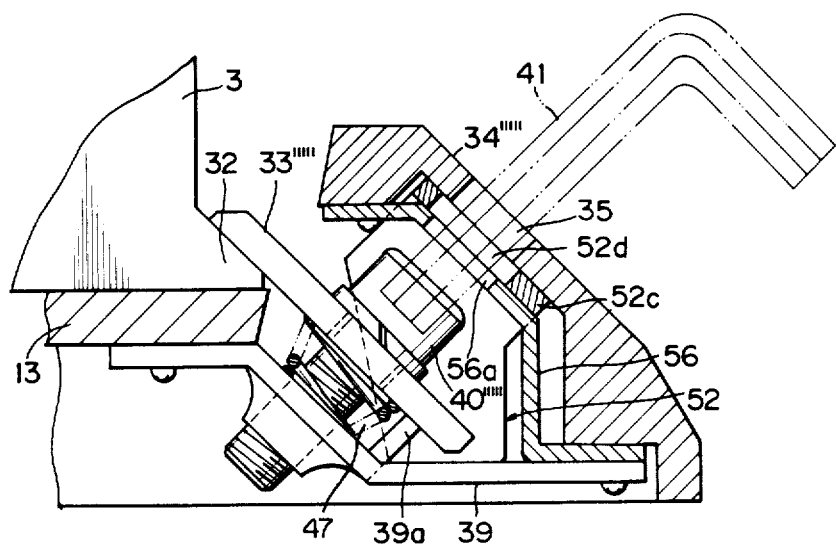
FIG. 17 is a view taken along the line $B_1$—$B_2$ of FIG. 14.
Figure 18:
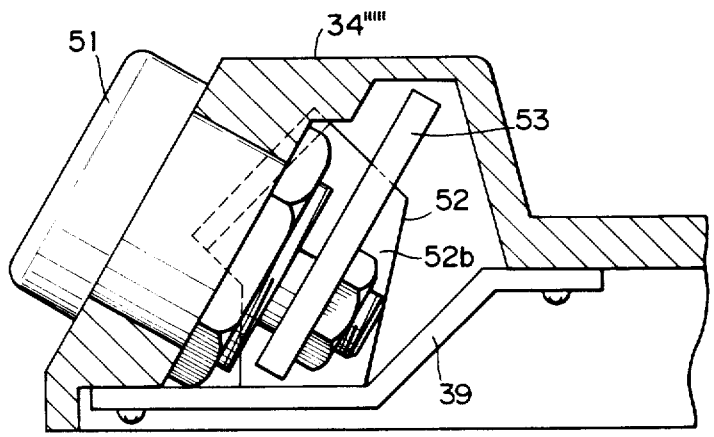
FIG. 18 is a view taken along the line $C_1$—$C_2$ of FIG. 14.

A still further embodiment of the present invention is illustrated in FIG. 12. In this example, the pressing plate 33''' is urged obliquely upward by a spring 47. Cover 34''' covers the screw 40'''. A guide rod 46 is provided for preventing the pressing plate 33''' from rotating about the screw 40'''. By loosening the screw 40''', the pressing plate 33''' is moved obliquely upward without changing the inclination angle thereof. With this construction, similar to the embodiment of FIG. 10, by loosening the screw 40''', the pressing plate 33''' is moved upward by the function of the spring 47, which is convenient when inserting the projection 32 of the transceiver unit 3.

Figure 13:
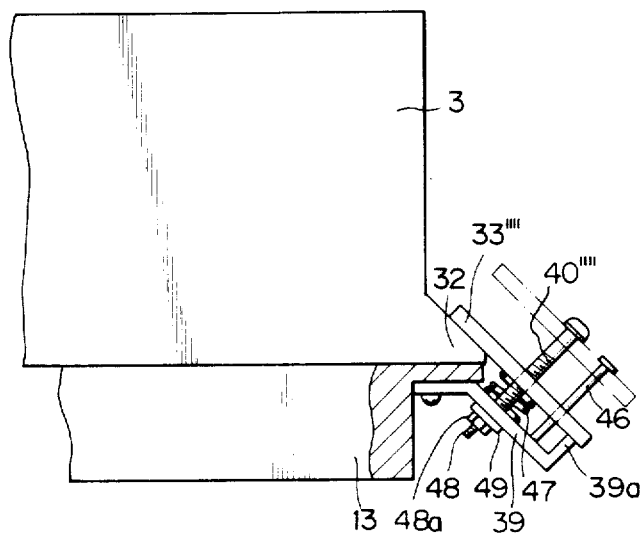
FIG. 13 is a partial sectional view of still another embodiment of the present invention.

A still further embodiment is illustrated in FIG. 13. In this example, no cover for covering the screw 40 is needed. As a means for preventing the screw 40'''' from falling out of the bracket 39, an arrangement is made wherein a small screw 48 is provided at the end of the screw 40'''' and a stop 49 is attached to the small screw 48 by using a nut 48a, so that the screw 40'''' is not drawn out of the bracket 39 when loosened. Pressing plate 33'''' is provided and is identical to pressing plate 33'''' of FIG. 12.

A still further embodiment of the present invention is illustrated in FIGS. 14 to 18. In this example, a lock means for closing the through hole 35 formed in the cover 34''''' is provided to prevent manipulation of the screw 40''''' by inserting an instrument 41 through the through hole 35. Cover 34''''' covers the screws 40''''' and pressing plate 33'''''. A support bracket 56 (FIG. 17) is disposed inside the cover 34'''''. A movable member 52 is disposed between the support bracket 56 and the cover 34'''''. The movable member 52 is slidable, as shown by a double-headed arrow D (FIG. 14), and has side plates 52a and 52b at both ends thereof. A spring 54 engages with one side plate 52a to urge the movable member 52 rightward in FIG. 14. An end of the spring 54 is received in a recess 61 (FIGS. 15 and 16) formed in the mount 13. The other end of the spring 54 engages with a rod 60 projecting from the side plate 52a to prevent the spring 54 from falling out. A cam 53 of a cylinder lock 51 abuts against the other side plate 52b of the movable member 52 (FIGS. 15, 16, 18), and a hole 52d is formed in a slide plate 52c of the movable member 52. The support bracket 56 has a hole 56a (FIG. 17) which aligns with the through hole 35 of the cover 34'''''. The cam 53 is rotated by a key (not shown) inserted into the cylinder lock 51, so that the movable member 52 slides as indicated by the arrow D (FIG. 14).

FIG. 15 represents a state wherein the hole 35 of the cover 34''''' is aligned with the hole 52d of the movable member 52 so that the instrument 41 for manipulation of the screw 40''''' (FIG. 17) can be inserted through the holes 35, 52d, and 56a. This state is represented in dashed lines in FIG. 14.

FIG. 16 represents another state wherein the movable member 53 is shifted leftward against the force of the spring 54 by rotating the cam 53, so that the hole 52d of the movable member 52 moves away from the hole 35 of the cover 34'''''. This state is represented by dash-two dot lines in FIG. 14. In this state, the instrument cannot be inserted to gain access to the screw 40'''''.

The locked state of FIG. 16 wherein the hole 35 is closed, and the unlocked state of FIG. 15 wherein the hole 35 is opened, in relation to the rotational state of the cam 53, are exchangeable by changing the location of the hole 52d of the movable member 52.

By providing such a lock means, it becomes even more difficult for a third person to manipulate the screw 40''''' securing the transceiver unit 3, which further prevents the transceiver unit from being tampered with or stolen.

The lock means is not limited to the aforementioned cylinder lock means comprising a cam, but may be any means which can close and open the hole 35 of the cover 34''''''.

What is claimed is:

1. A housing and securing structure for a radio communication device including communication circuits, comprising:

a case for housing a radio communication device, said case including an upper lid, a bottom lid and a main housing body having one of the communication circuits mounted thereon;

mount means, having a mount surface, for mounting said case such that said bottom lid faces said mount surface of said mount which is secured to a vehicle;

means for securing said case of said mount means, said securing means including a projection member which projects in the direction parallel to said mount surface and a pressing plate with an aperture, which plate defines a recess for receiving said projection member between said pressing plate and said mount means, said projection member being disposed on and integrally assembled with one of said case and said mount means and said pressing plate being disposed on the other one of said case and said mount means;

a bracket immovable with respect to said mount means;

a first screw being screwed into said bracket through said aperture of said pressing plate and having a head which engages and urges said engagement member, located between said pressing plate and said mount means with which said bracket is immovably assembled, onto said projection member;

a second screw inserted from said bottom lid side into said case, penetrating through said main housing body and screwed into said upper lid from the inside thereof to simultaneously combine said upper lid, bottom lid and main housing body into one unit;

a panel having a connector for connecting to said communications circuit, said panel being disposed on an outer surface of said case and integrally assembled with said case which is mounted on said mount means;

means for attaching said panel to said case, said means comprising a projection piece and a receiver for receiving said projection piece, one of said projection piece and said receiver being disposed on the upper and lower edges of said panel, and the remaining one of said projection piece and said receiver being disposed on said upper lid and said bottom lid, said panel being integrally assembled with said upper lid, said bottom lid and said main housing by said second screw; and a cover disposed over said pressing plate and having a hole formed therein for insertion of an instrument for manipulation of said first screw, said hole being smaller than the head of said first screw, said cover being disposed at a distance from said bracket which is shorter than the length of said first screw, so that the cover prevents the first screw from being completely unscrewed and dropping out of said bracket.

2. The structure according to claim 1, wherein said projection member of said means for securing said case to said mount means is provided on said panel.

3. The structure according to claim 1, wherein said engagement member is a pressing plate pressed against said projection member and retained on said bracket by said first screw.

4. The structure according to claim 3, wherein said first screw is a tamper-proof type screw having a screw head with a recess in which a pin is projected to allow insertion of only a specific instrument having a hole formed therein for receiving said pin.

5. The structure according to claim 3, wherein said projection member has an inclined surface with which said pressing plate is in contact.

6. The structure according to claim 3, wherein said pressing plate moves along the axial direction of said first screw to press against and release said projection member.

7. The structure according to claim 6, wherein a rod for preventing said pressing member from being rotated about said first screw is provided alongside said first screw.

8. The structure according to claim 3, wherein an end of said pressing plate is pivotably attached to said mount side so that said pressing plate rotates to press against and release said projection member.

9. The structure according to claim 6, 7 or 8, wherein a spring is provided for urging said pressing plate toward a direction in which said projection member is released.

10. The structure according to claim 1, wherein said bracket is slidable and adjustable with respect to said mount means.

11. The structure according to claim 1, further comprising:

lock means, comprising a plate member having holes formed therein and being disposed behind said cover, for closing said hole of said cover so as to prevent insertion therein of said instrument, said plate member being movable between a locking position wherein said hole of said plate member is offset from said first screw an unlocking position wherein said hole of said plate member is in alignment with said first screw.

* * * * *

UNITED STATES PATENT AND TRADEMARK OFFICE
CERTIFICATE OF CORRECTION

PATENT NO. : 4,714,303
DATED : December 22, 1987
INVENTOR(S) : Suzuki et al.

It is certified that error appears in the above-identified patent and that said Letters Patent is hereby corrected as shown below:

Front page, [57] ABSTRACT, line 15, "having" should be --has--;
line 17, after "and" delete ","; after "screw" insert --,--.

Col. 1, lines 25, 27, 29, 33, 38, "tranceiver" should be --transceiver--.

Col. 2, lines 43, 46, 52-53, 56, 58, 60, 63, 67 "tranceiver" should be --transceiver--.

Col. 3, lines 1, 11, 55, 60, 63, "tranceiver" should be --transceiver--.

Col. 3, line 55, change "13" to --3--;
line 56, change "3" to --13--.

Col. 4, lines 48, 50, 57, 58, "tranceiver" should be --transceiver--.

Col. 5, line 23, change "tranceiver" to --transceiver--.

Signed and Sealed this

Twenty-first Day of June, 1988

Attest:

DONALD J. QUIGG

Attesting Officer

Commissioner of Patents and Trademarks